US005494550A

United States Patent [19]

Benge

[11] Patent Number: 5,494,550

[45] Date of Patent: Feb. 27, 1996

[54] METHODS FOR THE MAKING OF ELECTRONIC ARTICLE SURVEILLANCE TAGS AND IMPROVED ELECTRONIC ARTICLE SURVEILLANCE TAGS PRODUCED THEREBY

[75] Inventor: S. Eugene Benge, Middletown, Ohio

[73] Assignee: Sensormatic Electronics Corporation, Deerfield Beach, Fla.

[21] Appl. No.: 117,785

[22] Filed: Sep. 7, 1993

[51] Int. Cl.[6] .......................... B32B 31/04; B32B 31/18; G08B 13/14

[52] U.S. Cl. .......................... 156/268; 156/51; 156/52; 156/247; 156/248; 156/256; 156/265; 156/270; 156/324; 340/572

[58] Field of Search .......................... 156/51, 52, 268, 156/324, 256, 270, 247, 248, 252, 265; 340/572

[56] References Cited

U.S. PATENT DOCUMENTS

| | | | |
|---|---|---|---|
| 3,720,141 | 3/1973 | Stock | 156/515 X |
| 4,910,499 | 3/1990 | Benge et al. . | |
| 5,006,856 | 4/1991 | Benge et al. . | |
| 5,059,950 | 10/1991 | Perchak | 340/572 |
| 5,182,544 | 1/1993 | Aquilera et al. | 340/572 |

*Primary Examiner*—David A. Simmons
*Assistant Examiner*—M. Curtis Mayes
*Attorney, Agent, or Firm*—Robin, Blecker, Daley & Driscoll

[57] ABSTRACT

An improvement in a method for the manufacture of electronic surveillance tags by providing a continuous web of electrically insulative material, applying to opposed surfaces of the electrically insulative material web a succession of first and second electrically conductive coils and applying to the succession of first electrically conductive coils a normally electrically insulative deactivation structure extending across the first coil succession and convertible to be electrically conductive, the improvement comprising the step of providing an electrostatic charge drain in electrically conductive relation with each of the first electrically conductive coils substantially throughout the manufacture of the tags. The new step may be practiced by providing an elongate electrically conductive member across the succession of first electrically conductive coils in electrical continuity therewith. Alternatively, the step may be practiced by configuring the succession of first coils integrally with the electrostatic charge drain. In either case, the drain is removed in a final stage of tag manufacture. Other improvements are also set forth.

25 Claims, 12 Drawing Sheets

METHODS FOR THE MAKING OF ELECTRONIC ARTICLE SURVEILLANCE TAGS AND IMPROVED ELECTRONIC ARTICLE SURVEILLANCE TAGS PRODUCED THEREBY

FIELD OF THE INVENTION

This invention relates generally to electronic article surveillance (EAS) and pertains more particularly to providing improved methods and apparatus for the making of EAS tags and improved tags resulting therefrom.

BACKGROUND OF THE INVENTION

The genesis of the subject invention resides in a continuing effort to improve extant EAS tags (also called EAS labels) and tag production practices such as are set forth in various commonly-assigned prior art patents, for example, U.S. Pat. No. 5,006,856.

Tags of the '856 patent comprise spiral coils disposed in generally facing relationship on opposed sides of a dielectric layer, with the coils interconnected in an area outside of the dielectric layer. A resonant circuit is accordingly provided and is enclosed within electrically insulative outer covering members.

In use, a tag is attached to an article to be monitored as against fraudulent activity, and if the article is carried to an exit of the surveillance zone, such as the exit of a store, an alarm condition attends incidence of energy on the tag of frequency equal to the resonant frequency of the tag.

Tags having facility for "deactivation" are likewise shown in the '856 patent and discussed also in detail below. The deactivation structure may comprise an electrically conductive member astride the turns of one of the spiral coils and isolated therefrom by an intervening layer of material which is normally electrically insulative but, on incidence of high energy on the tag, i.e., in excess of that required for causing alarming resonance, converts to electrically conductive character. On that event, the conductive member with the converted layer short-circuits the spiral coil. The deactivation normally precludes the tag from again resonating and typically takes place at a checkout counter, from which the article with tag therewith can freely pass from the surveillance zone.

As has been recognized in the past, electrostatic charge buildup on individual tags can cause undesirable tag deactivation by effecting conversion of the convertable layer. Such charge buildup can occur in the course of tag production and further in the course of printing on the tags. As is discussed also in detail below, tags are produced in a continuous sequence, with the deactivator structure applied continuously in the sequence, i.e., as a deactivator web providing electrical connection of the series of tags in the course of being produced. While the continuous deactivator web can function as a drain to prevent static discharge from deactivating the labels during the manufacturing process, it can also function as a vehicle for electrostatic charge to flow across a sequence of tags causing deactivation of the tag sequence in the course of production.

One past measure taken for avoiding such flow of electrostatic charge has been to make cuts through the deactivator web, as in FIG. 31 of the '856 patent (cuts 520). While the deactivator web remains continuous between adjacent tags, the '856 patent notes the cuts to be effective in preventing premature deactivation due to electrostatic charge in the tag manufacturing equipment or subsequently in printing equipment.

Another measure in this respect has been to provide a conductive film for charge drain purposes, as is shown at 600, 601 in FIG. 31 of commonly-assigned prior art U.S. Pat. No. 4,910,499. The conductive film constitutes a component of the tags following production and serves to drain charge also in the course of printing. Its presence, however, prevents accurate determination of the "Q" of the tag. Further, the drain mechanism is fully capacitive, given that an insulative web intervenes the conductive film and the tag coil structure.

A further measure in this respect is seen in FIGS. 25 and 26 of the '856 patent, where, at the completion of forming a sequence of connected tags, holes 407 are punched through the deactivation layer between adjacent tags to sever the same and render adjacent tags with no electrical connection therebetween. This practice affords electrical isolation of adjacent completed and connected tags when they are collected on a reel. However, this measure affords no relief as against electrostatic charge which may build up in the preceding steps in the manufacture of the tags. Further, since the holes are punched on completion of tag making, they extend fully through all layers of the tag and are undesirably viewable in the finished product.

From applicant's viewpoint, the various past efforts to overcome the adverse influence of electrostatic charge buildup in/on deactivatable EAS tags/circuits, while constituting meaningful steps in the evolution of correction of the problem and providing effective production practice and effective tags, have not yielded as low a reject rate in production as is optimally desirable.

To provide more specific background discussion facilitating an appreciation of the practices and tags of the subject invention, detailed description of extant practices is now provided, with reference to those drawings herein which are labelled as being prior art.

Referring to FIG. 1, there is shown an exploded view of a tag generally indicated at 19. The tag 19 is shown to include a sheet 20T having pressure sensitive adhesive 21 and 22 on opposite faces thereof. A mask 23 in a spiral pattern covers a portion of the adhesive 21 and a release sheet 24T is releasably adhered to the adhesive 22. The mask 23 renders the adhesive 21 which it covers non-tacky or substantially so.

A conductor spiral indicated generally at 25 includes a spiral conductor 26 having a number of turns. The conductor 26 is of substantially the same width throughout its length except for a connector bar 27 at the outer end portion of the conductor spiral 26. There is a sheet of dielectric 28T over and adhered to the conductor spiral 25 and the underlying sheet 20T by means of adhesive 29.

A conductor spiral generally indicated at 30 includes a spiral conductor 31 having a number of turns. The conductor 31 is adhered to adhesive 29' on the dielectric 28T. The conductor 31 is substantially the same width throughout its length except for a connector bar 32 at the outer end portion of conductor spiral 30.

The conductor spirals 25 and 30 are generally aligned in face-to-face relationship except for portions 33 which are not face-to-face with the conductor 26 and except for portions 35 which are not face-to-face with the conductor 31. A sheet 37T has a coating of a pressure sensitive adhesive 38 masked off in a spiral pattern 39. The exposed adhesive 38' is aligned with the conductor spiral 30. Adhesive is shown in FIG. 1 by heavy stippling and the masking is shown in FIG. 1 by light stippling with cross-hatching.

The connector bars 27 and 32 are electrically connected, as for example by staking 90 (FIG. 2). The staking 90 occurs where connector bars 27 and 32 are separated only by adhesive 29 or are in direct electrically conductive contact with no intervening adhesive or other medium. There is no paper, film or the like between the connector bars 27 and 32. Accordingly, the staking 90 is effective for electrically conductive interconnection of connector bars 27 and 32.

The process for making the tag of FIG. 1, which does not include deactivation structure, is described in FIG. 3 of the '856 patent, to which patent incorporating reference is hereby made for all purposes.

On the other hand, FIG. 3 herein shows that portion of the '856 FIG. 3 manufacturing apparatus as modified to provide tags with deactivation structure. A pair of coating and drying stations is generally indicated at 111 and 112 where respective coatings 113 and 114 in the form of continuous stripes are printed and dried. The coating 113 is conductive and is applied directly onto the pressure sensitive adhesive 38 on the web 37. The coatings 114 are wider than the respective coatings 113 which they cover to assure electrical isolation, as best shown in FIGS. 4 and 5. The coatings 114 are composed of a normally non-conductive activatable material.

Referring to FIGS. 6 and 7, there is shown a finished deactivatable tag 37T' with the coatings 113 and 114 having been severed as the tag 37T' is severed from the tag web as indicated at 113T and 114T respectively. As shown the coating 113T is of constant width and thickness throughout its length and the coating 114T is of constant width and thickness but is wider than the coating 113T. The coating 113T which is conductive is thus electrically isolated from the conductor spiral 30. The coatings 113T and 114T comprise an activatable connection AC (FIG. 9) which can be activated by subjecting the tag to a high level of energy above that for causing the resonant circuit to be detected at an interrogation zone.

The showings of prior art practices in FIGS. 8 and 9 herein correspond to FIGS. 24 and 25 of the '856 patent. The deactivator webs 318 and 319, corresponding to the deactivator structure 113T and 114T of FIGS. 6 and 7 hereof, are separated into longitudinally spaced deactivator strips or stripes 318' and 319'. The separation is accomplished in accordance with the specific embodiment shown in FIG. 8, by punching out portions of the web 238 and the deactivator webs 318 and 319 to provide holes 407. For this purpose, a diagrammatically illustrated rotary punch 403 and a rotary die 404 are used. The rotary punch 403 has punches 405 and the rotary die 404 has cooperating die holes 406. The resultant holes 407 are narrower than the spacing between the resonant circuits. The holes 407 are thus registered with the margins of the longitudinally spaced resonant circuits as shown in FIG. 9. Thus, the probability of arcing of static electricity between resonant circuits in a longitudinal direction and between deactivator strips 318' (or 319') is lessened. However, such "severing" of the deactivation webs takes place at a quite late stage in the manufacturing process and does not preclude electrostatic charge movement in preceding manufacturing process steps.

FIGS. 10 and 11 herein correspond respectively with FIGS. 31 and 32 of the '856 patent. In FIG. 10, resonant circuits RC formed of connected pairs of spiral conductors 400 and 401 having plural turns are shown provided with an activatable connection or deactivator AC. The deactivators AC are made from a deactivator web ACW. In the manufacture of the tag web shown in FIG. 10, the deactivator web ACW is cut as shown at 520. Each cut 520 is more than a slit because it causes permanent spacing or separation between portions or sections or strips AC1, AC2 and AC3 associated with each tag T. As shown, each tag T comprises the portion of the tag web between adjacent pairs of phantom lines TL. The section AC1 extends between one end of the tag T along one phantom line TL and a cut 520, the section AC2 extends between adjacent but spaced cuts 520 of a tag T, and the section AC3 extends between the other cut 520 in the tag T and the other end of the tag T along the other phantom line TL.

Such cutting or slitting is practiced at a quite early stage of the manufacturing process since the deactivator web must be exposed to perform the cutting.

FIG. 11 shows the upper spiral conductor 401. The deactivator web ACW is comprised of normally non-conductive or breakdown material 521. The deactivator web ACW is also comprised of a deactivating conductor in the form of a vacuum metalized coating 522 of aluminum to which the normally nonconductive breakdown material 521 is adhered. The coating or layer 522 is deposited on a polyester film 523 which acts as a carrier or support for the coating 522 and the breakdown material 521.

A mask pattern 524 (corresponding to mask pattern 23) is disposed between the film 523 and an adhesive coating 525 on a polyester film 526. The cuts 520 are identical and one of the cuts 520 is shown in detail in FIG. 11. The cut 520 in FIG. 11 is shown to have two widths for a reason as will be evident from FIG. 12.

The upper spiral conductor 401 has eight conductor portions 401-1 through 401-8 at first through eighth locations numbered 1 through 8. In the preferred embodiment, one cut 520 is spaced between the first and second conductor portions 401-1 and 401-2, that is, between the first and second locations and another cut 520 is spaced between the seventh and eighth conductor portions 401-7 and 401-8 between the seventh and eighth locations. The adjacent cuts 520 of any one tag effectively make section AC2 the deactivator AC. It is evident that the deactivator AC is adjacent and crosses less than all the turns of the spiral conductor 401. When the deactivator AC is operated, the breakdown coating 521 at one or more locations 2 through 7 becomes conductive and consequently the deactivating conductor 522 becomes electrically connected to the resonant circuit at the location or locations 2 through 7 where breakdown occurs. If there is breakdown at only one location, the conductor 522 acts like a spur electrically connected to the spiral conductor 401 and thus affects the resonant circuit. However, breakdown can also occur at two or more locations, second through seventh, which will electrically connect portions of the spiral conductor 401 to each other to prevent detection of the resonant circuit of the tag.

The '856 patent states that there is even considerable improvement in deactivation when a cut 520 is made through the deactivator web ACW only between the first and second conductor portions 401-1 and 401-2 or only between the seventh and eighth conductor portions 401-7 and 401-8. In this case there is only one cut 520 in the deactivator web in each tag. Accordingly, the deactivator strip in each tag is separated into two deactivator sections or deactivator strips.

The short deactivation strips, AC1 and AC3 across TL in FIG. 10, however, provide electrical continuity between successive circuits until the severing of the deactivator web occurs, as noted at a quite late stage of the manufacturing process.

Referring to FIG. 12, there is diagrammatically illustrated a portion of the process for making the tags shown in FIGS. 10 and 11. Cutter roll 529 has cutter blades 530 which produce the cuts 520 in the deactivator web ACW. The web 37 passes between the cutter roll 529 and a back-up roll 531. It should be borne in mind that the web 37 is under tension as it is drawn partially about rolls 67 and 116, heated drum 115 and roll 117. The deactivator web has been cut into sections AC1, AC2 and AC3, which are no longer in tension and therefore are free to shrink. The deactivator sections AC1, AC2 and AC3 are not under tension and consequently they do not stretch along with the web 37. Specifically, with reference to FIG. 11, the resulting cut opening 527 in the polyester film 526 the associated adhesive 525 and pattern 524 are narrower than the cut opening 528 in the deactivator AC and its associated supporting or carrier web 523. Further, it is found that the gap provided by cuts 520, clearly less than that afforded by holes 407 (FIG. 9), is not of sufficient measure to effectively insure preclusion of movement of electrostatic charge. Also, the practices of cutting can themselves give rise to electrostatic charge. Finally, it has been found that for the cut tag version, higher deactivation field intensity is required and that, with the tag retaining a partly non-deactivated coil, i.e., that located outwardly of cuts 520, the deactivated tag can, at times, still resonate as if it were not deactivated.

While the cuts 520 also have the effect of preventing premature deactivation in the tag manufacturing equipment or subsequently in printing equipment due to electrostatic charge, applicant looks to the same, as in the case of the first described approach to the electrostatic charge problem (holes 407 above) as not providing as low a reject rate in production as is optimally desirable.

To summarize the state of the art, present practices call for cutting the deactivator web at a quite early stage of the process, since the deactivator web need be exposed for cutting. This undermines the effectiveness of the deactivator web in any subsequent static drain function. The continuous film drain provided in dielectric coupling with the coil structures is limited in that the charge drain is fully capacitive. Further, in present practices, the severing of the deactivator web takes place at a final stage of the process, and such step thus does not afford benefit in electrically separating adjacent tags during manufacture up to such final stage. Also, the step provides a hole extending fully through the tag which, to certain users, is aesthetically undesired.

SUMMARY OF THE INVENTION

The present invention has as its principal object the provision of improved methods and apparatus for deactivatable EAS tag manufacture.

A particular object of the invention is to more effectively address the electrostatic charge problem in present deactivatable tag making methods.

A further object of the invention is to provide deactivatable tags which exhibit electrical and mechanical integrity enhanced over that of the above-discussed prior deactivatable tags.

In overall perspective, applicant has devised a practice by which severing of the deactivator web can take place at an early stage of the manufacturing process and yet continuous, enhanced electrostatic charge drain is enabled throughout the manufacturing process.

To these ends, the invention provides, in one aspect thereof, an improvement in a method for the manufacture of electronic surveillance tags by providing a continuous web of electrically insulative material, applying to opposed surfaces of the electrically insulative material web a succession of first and second electrically conductive coils and applying to the succession of first electrically conductive coils a normally electrically insulative deactivation structure extending across the first coil succession and convertible to be electrically conductive, the improvement comprising the step of providing an electrostatic charge drain in electrically conductive relation with each of the first electrically conductive coils substantially throughout the manufacture of the tags. The new step may be practiced by providing an electrically grounded, elongate, electrically conductive member across the succession of first electrically conductive coils in electrical continuity therewith. Alternatively, the step may be practiced by configuring the succession of first coils integrally with the electrostatic charge drain and electrically grounding the drain. In either case, the drain is removed in a final stage of tag manufacture and does not interfere with accurate measurement of the Q of the tags.

Based on continuous drainage of electrostatic charge during most of the manufacturing process, the invention affords, in a second aspect, the flexibility of selecting the point for rendering the deactivator structure separate as between successive coils to which it is applied. Thus, any electrostatic charge buildup on the deactivator structure giving rise to deactivation of an individual tag is likewise bled to ground, since such event provides electrical continuity with the underlying coil and with the drain. The deactivation is accordingly limited to such individual tag.

In a third aspect, the invention provides an improvement to a method for the manufacture of electronic surveillance tags by providing a web of electrically insulative material, applying to opposed surfaces of the electrically insulative material web a succession of first and second electrically conductive coils and applying to the succession of first electrically conductive coils a normally electrically insulative deactivation structure extending across the first coil succession and convertible to be electrically conductive, the improvement comprising the step of removing the deactivation structure between the first electrically conductive coils without disturbance to the coils and without removal of the supporting insulative web or its adhesive layer. The removing step is practiced in such manner that the completed tag does not evidence any hole therethrough and exhibits continuous exterior surfaces.

The removing step is preferably practiced by cutting the deactivation structure exclusively transversely of the succession of first electrically conductive coils and vacuum withdrawing the cut portion of the deactivation structure. The step is further practiced at an early stage of the process, i.e., at a point in time prior to application of the first and second coil successions to opposite sides of the dielectric web.

Tags and tag succesions so produced constitute further aspects of the invention, as does the apparatus effecting the cutting and removal step.

The foregoing and other objects and features of the invention will be understood from the following detailed description of the invention and from the drawings wherein like reference numerals identify like components throughout.

DETAILED DESCRIPTION OF PREFERRED EMBODIMENTS AND PRACTICES

Figure 13:
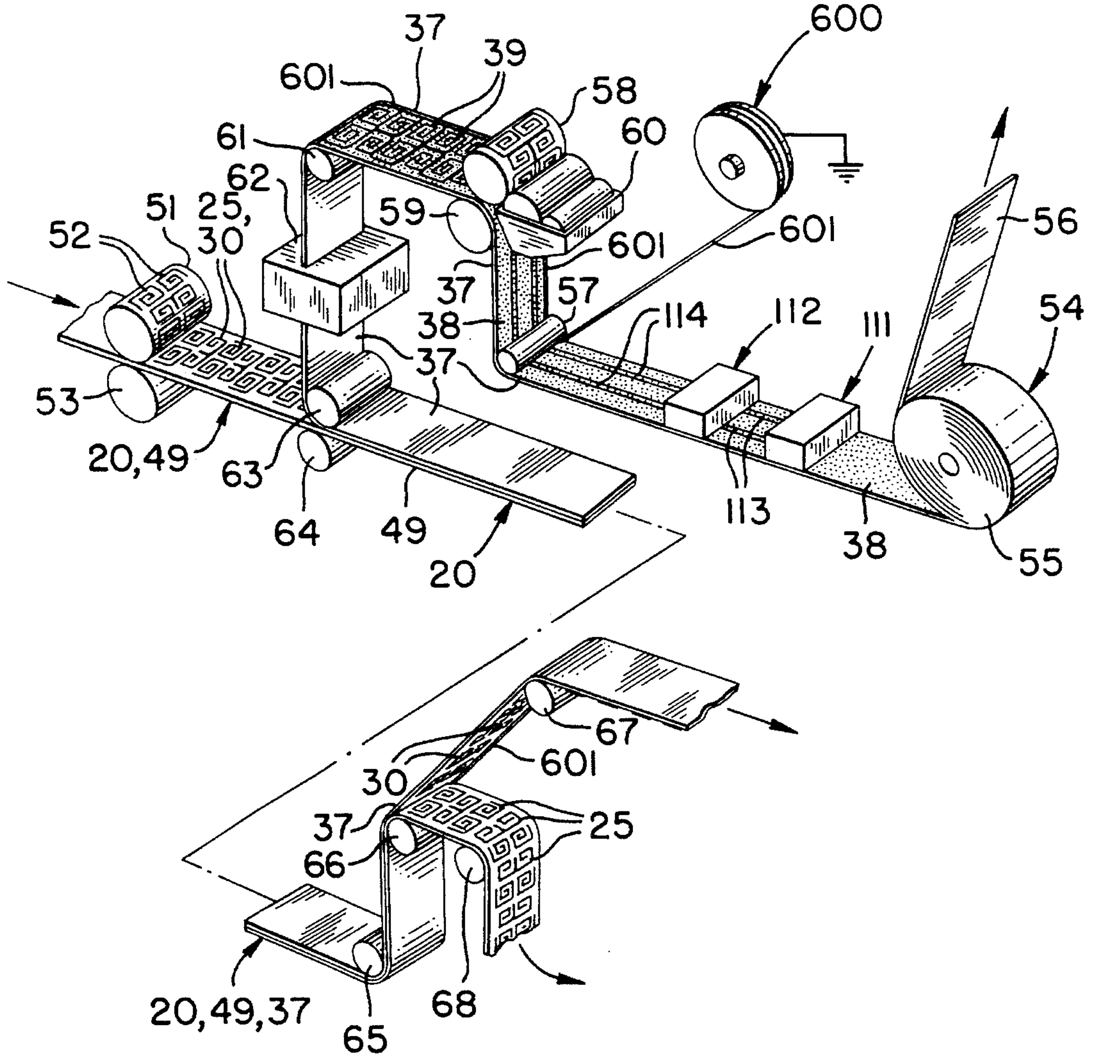
FIG. 13 is a fragmentary perspective view which illustrates apparatus of a deactivatable tag making method having lessened susceptibility to electrostatic charge in accordance with the present invention.

Referring to FIG. 13, roll 54 is shown to be comprised of a composite web 55 having a web 20 with a full-gum or continuous coating of pressure sensitive adhesive 38 and a release liner or web 56 releasably adhered to the upper side of the web 37 by the pressure sensitive adhesive 38. As shown, the release liner 56 is delaminated from the web 37 to expose the adhesive 38. The adhesive coated web passes under a pair of coating and drying stations indicated at 111 and 112 and partially around a sand paper coated roll 57.

Figure 1:
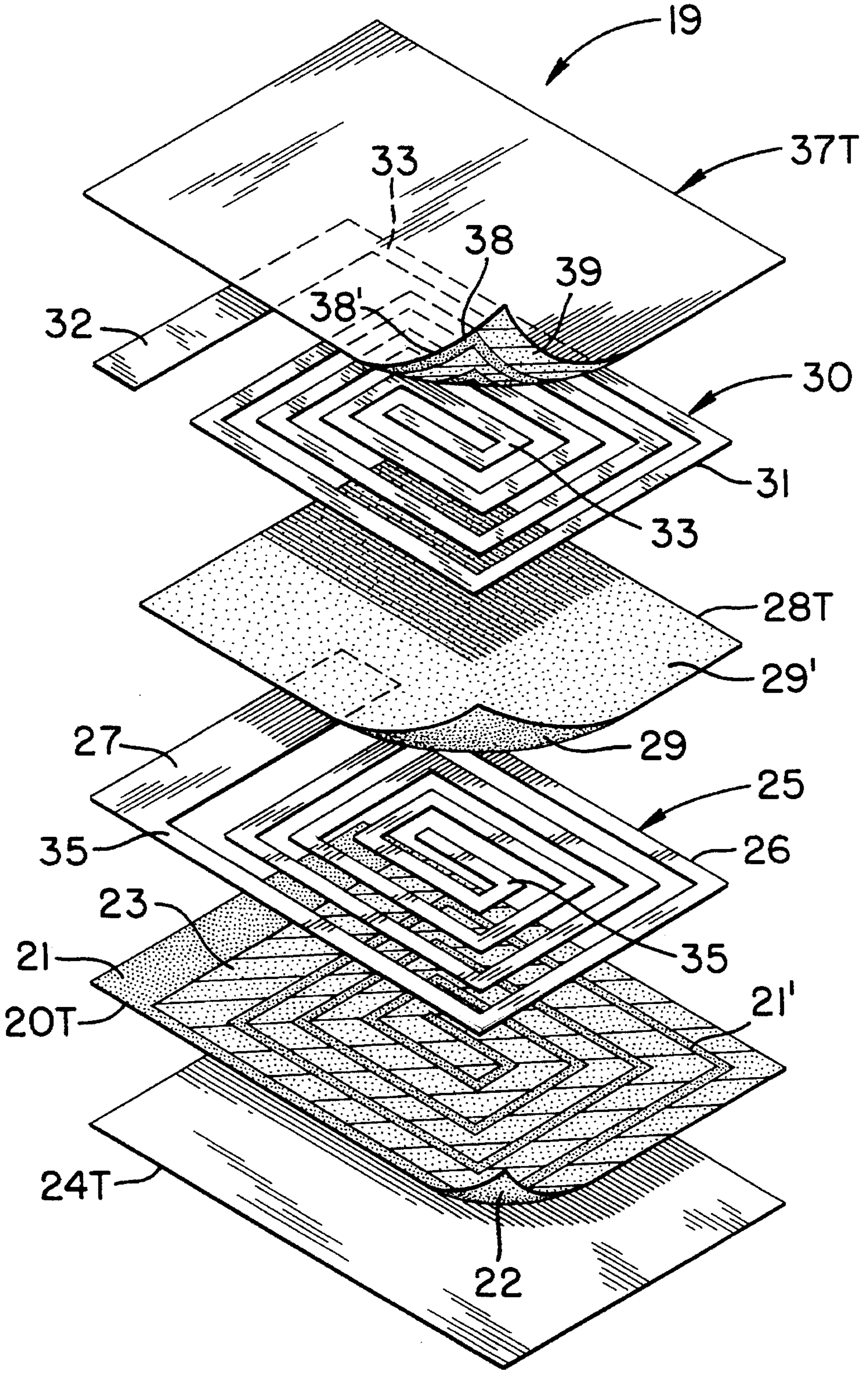
FIG. 1 (PRIOR ART)
FIG. 1 is an exploded perspective view of a tag produced by extant tag making methods.
Figure 2:
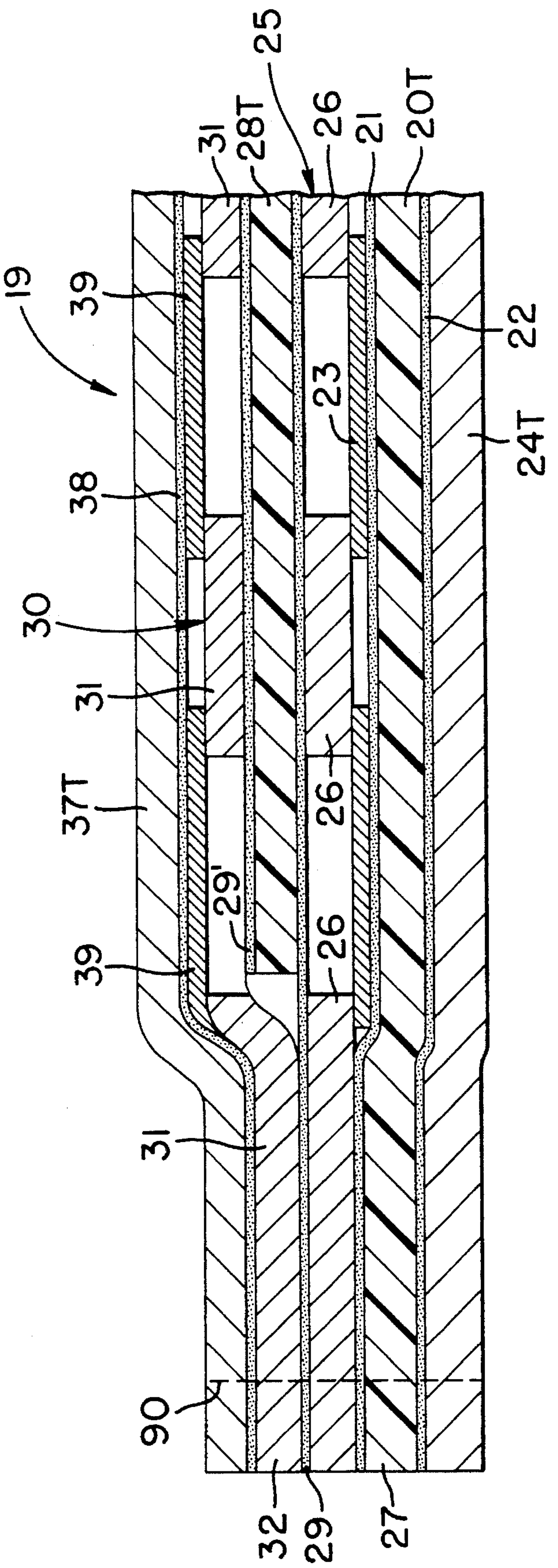
FIG. 2 (PRIOR ART)
FIG. 2 is a fragmentary cross-sectional view of the FIG. 1 tag.
Figure 3:
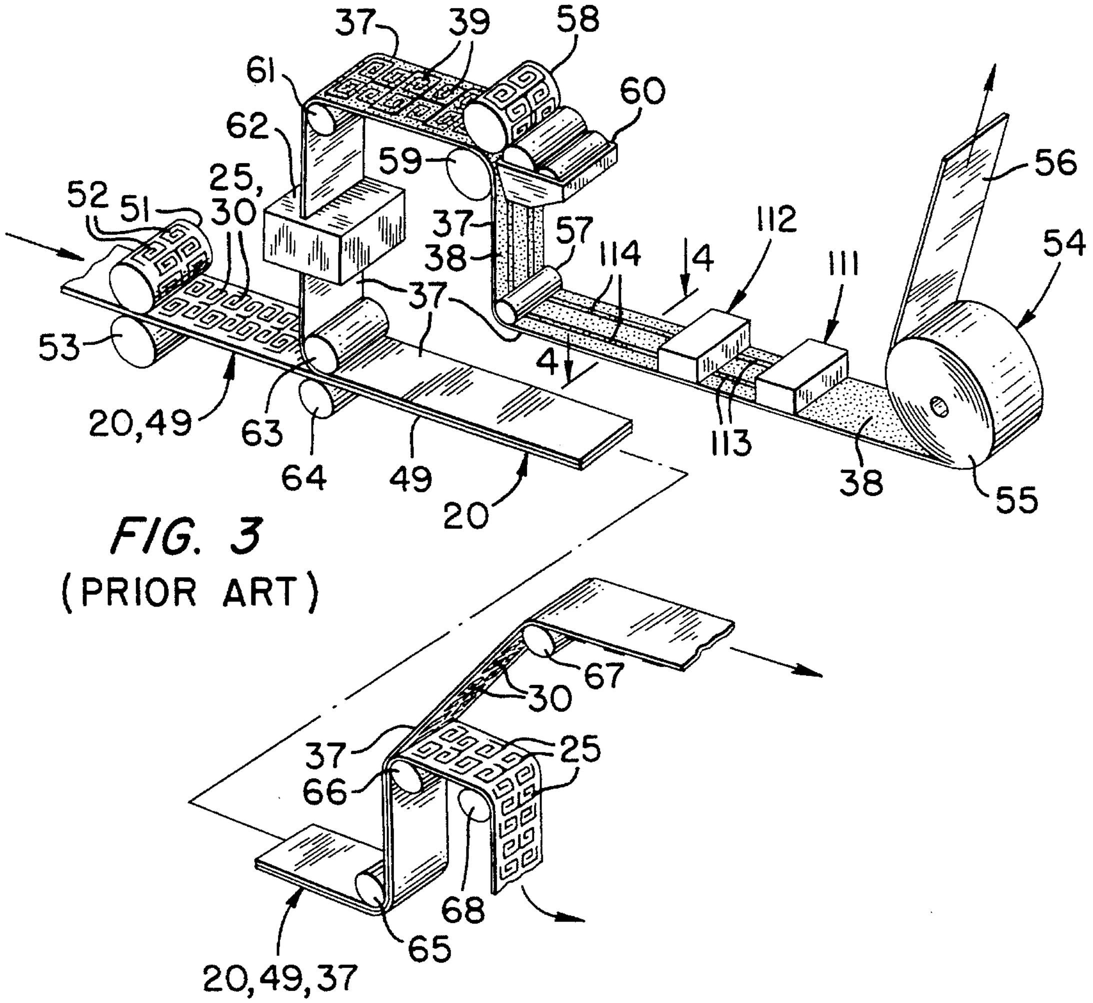
FIG. 3 (PRIOR ART)
FIG. 3 is a fragmentary perspective view which illustrates apparatus of an extant method of making deactivatable tags.
Figure 5:
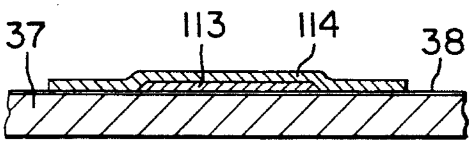
FIG. 5 (PRIOR ART)
FIG. 5 is a sectional view taken along line 5—5 of FIG. 4.
Figure 4:
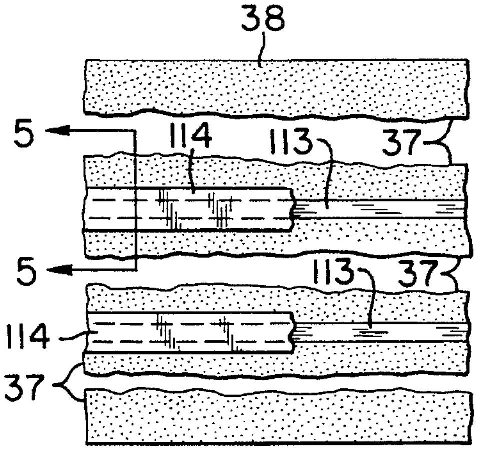
FIG. 4 (PRIOR ART)
FIG. 4 is a fragmentary top plan view taken along line 4—4 of FIG. 3.
Figure 6:
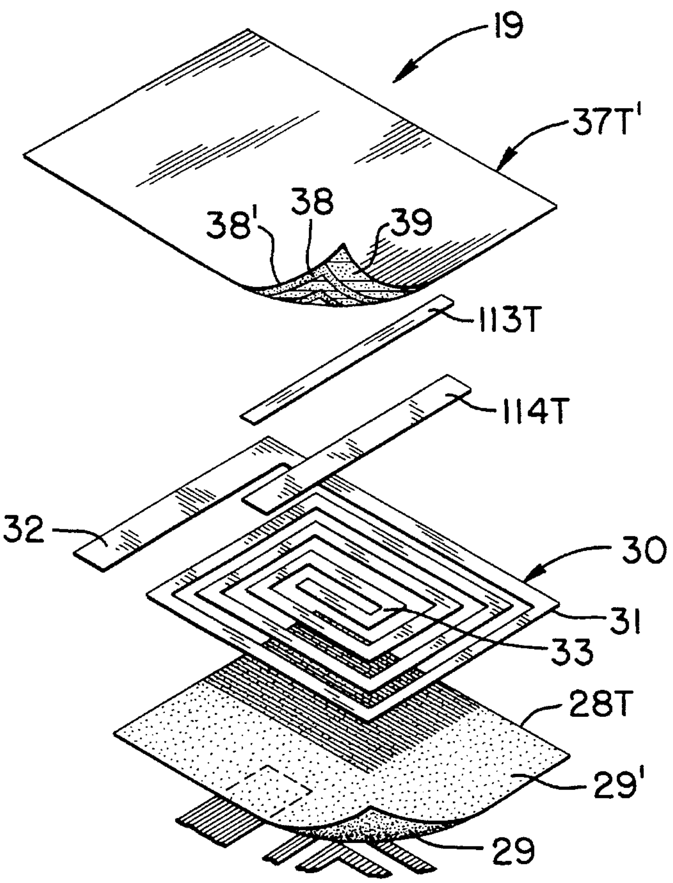
FIG. 6 (PRIOR ART)
FIG. 6 is a fragmentary perspective view similar to FIG. 1, but showing one embodiment of structure for deactivating the tag.
Figure 7:
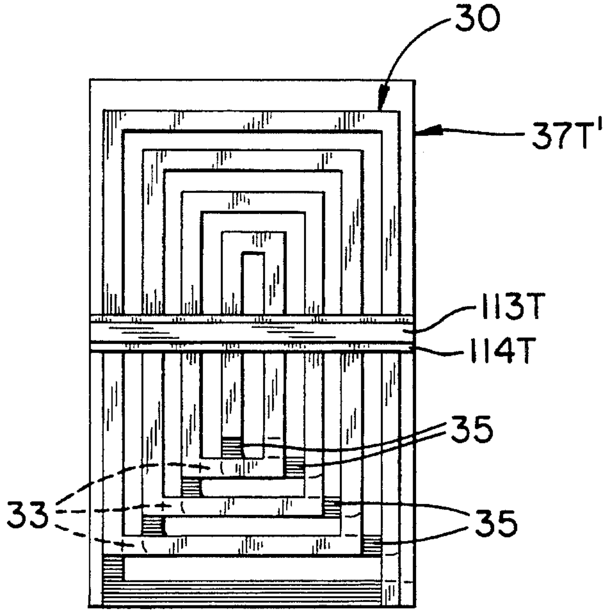
FIG. 7 (PRIOR ART)
FIG. 7 is a fragmentary top plan view of the tag shown in FIG. 6.

While the above described practice is that of the method of FIG. 3 of the '856, applicant departs therefrom at this juncture by introducing a narrow web 601 of planar, electrically conductive material such as copper or aluminum from a roll 600. Web 601 is laminated onto the coated web 37 as it passes partially around sandpaper roll 57.

Return is now to the practice per the '856 patent wherein the composite web 37 passes partially around rollers 59 and 61, through dryer 62, and partially around roller 63 where it meets web 20, 49. Webs 20, 49, 37 pass partially around rollers 65 and 66 and delaminate at roller 66.

As is discussed in the '856 patent, the coil patterns are electrically connected transversely. Further, they are in electrical connection with web 601. Accordingly with web 601 electrically grounded, throughout the process, until such time as web 601 is removed, electrostatic charge is drained as it occurs. Thus, the above-discussed deactivation of tags in the course of manufacture arising from their interconnection sequentially by the applied deactivation structure through electrostatic charge buildup and travel thereof is precluded per this aspect of the subject invention.

Figure 9:
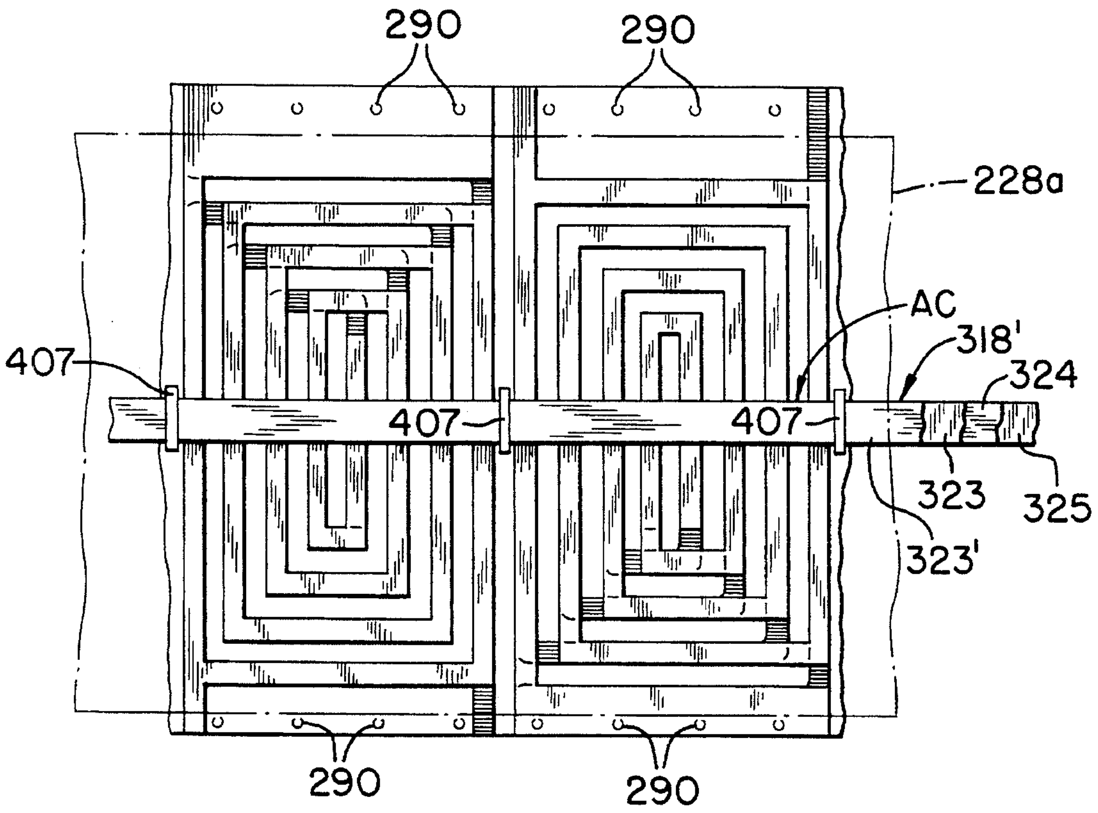
FIG. 9 (PRIOR ART)
FIG. 9 is a fragmentary top plan view of a succession of tags made in accordance with the FIG. 8 method.
Figure 8:
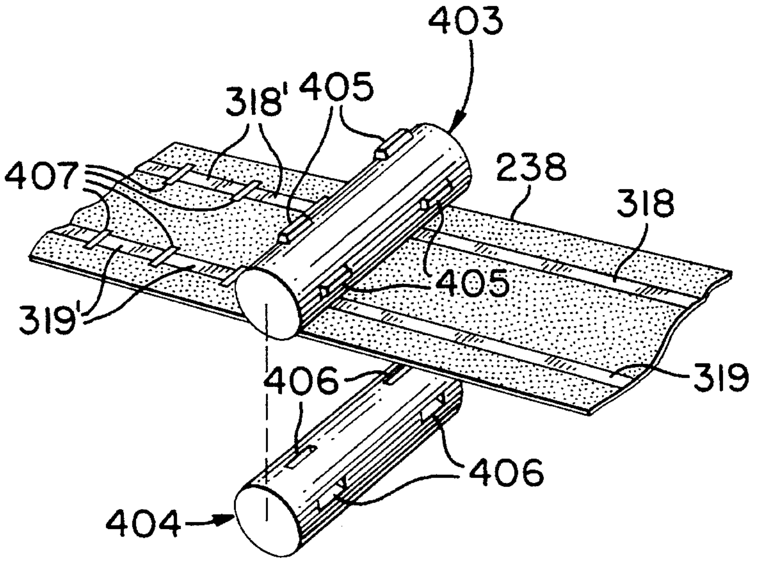
FIG. 8 (PRIOR ART)
FIG. 8 is a fragmentary perspective view which illustrates apparatus of an extant deactivatable tag making method having lessened susceptibility to electrostatic charge.
Figure 10:
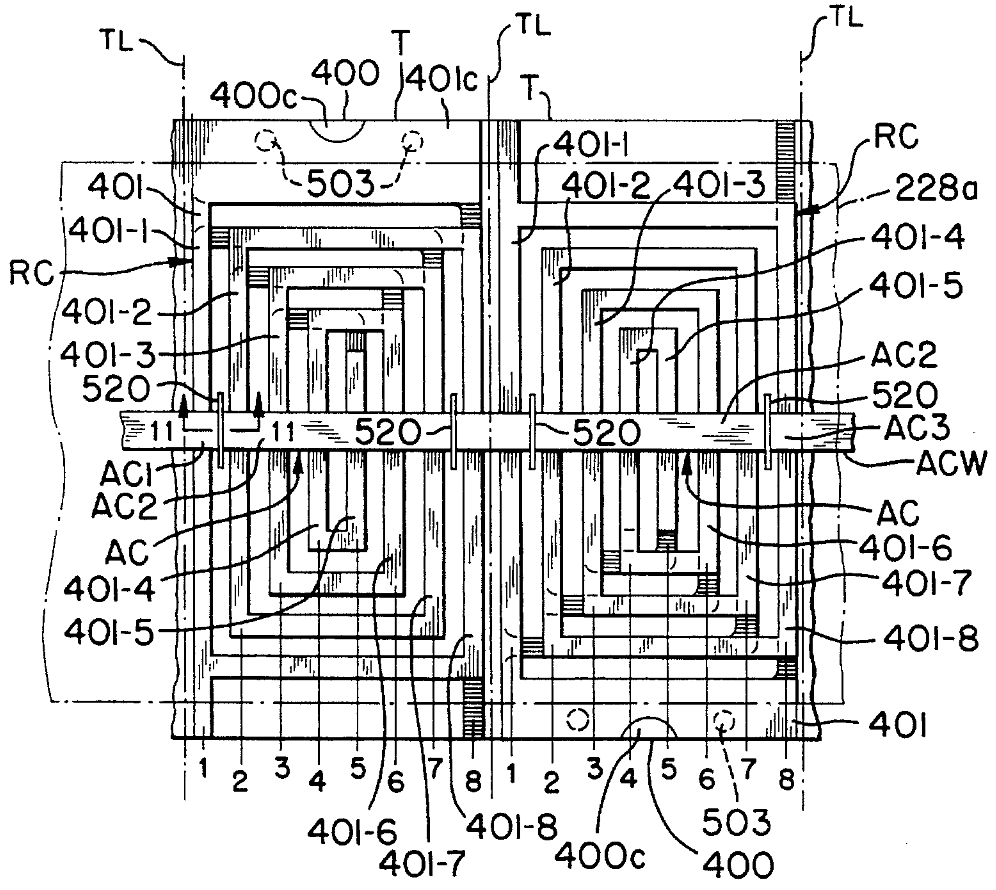
FIG. 10 (PRIOR ART)
FIG. 10 is a fragmentary top plan view of a succession of tags made in accordance with an alternative extant deactivatable tag making method having lessened susceptibility to electrostatic charge.
Figure 11:
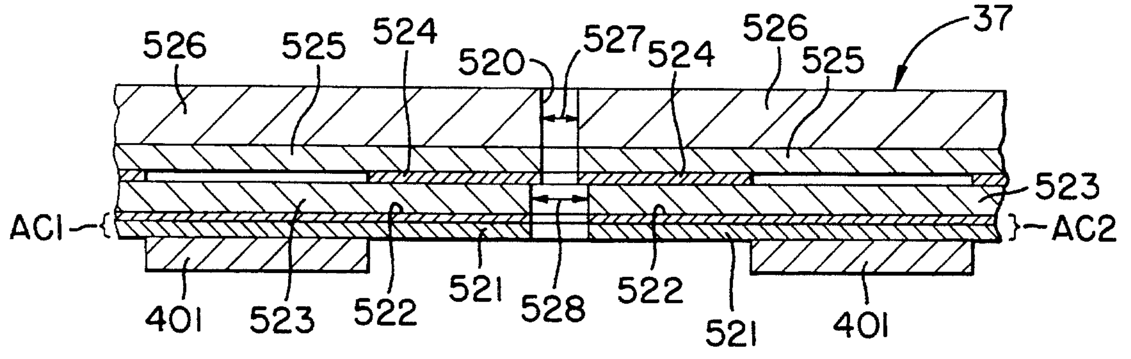
FIG. 11 (PRIOR ART)
FIG. 11 is a fragmentary sectional view as would be seen from plane 11—11 of FIG. 10.

Whereas the punching operation, i.e., full separation of the deactivator structure of the extant practice in FIG. 9 occurs late in the process, the present invention, by reason of the presence of the electrostatic charge drain substantially throughout the process, affords the opportunity to place the deactivation structure removal step earlier in the sequence of operations. The cutting practice of the extant practice shown in FIG. 10 can now be omitted. Thus, the new practice of FIG. 14 is the only step needed with respect to removal of deactivation structure.

Figure 12:
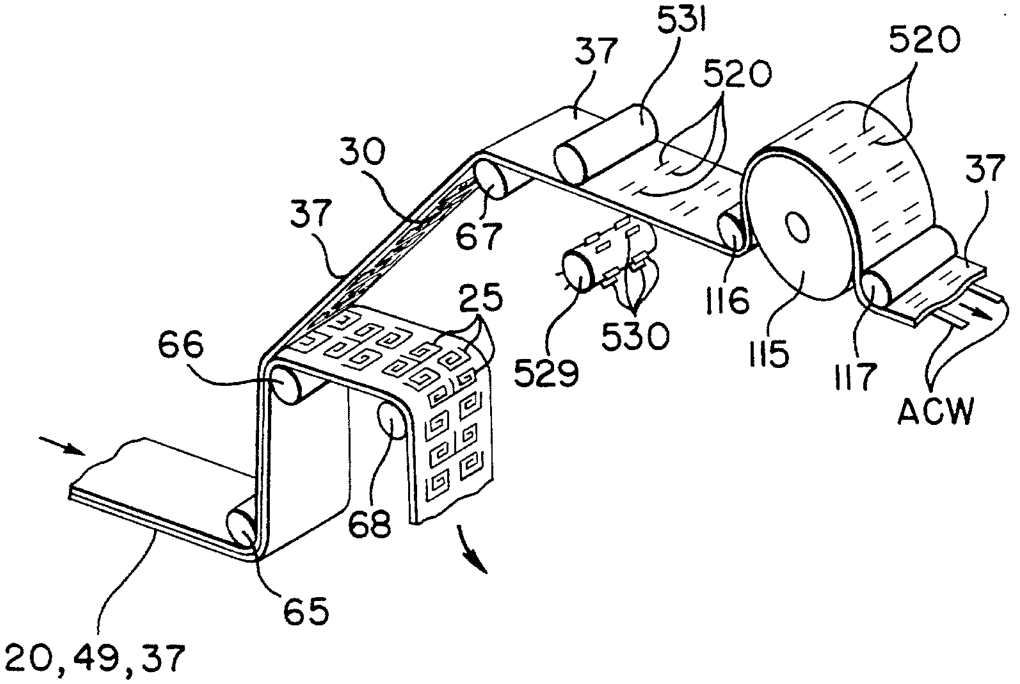
FIG. 12 (PRIOR ART)
FIG. 12 is a fragmentary perspective view which illustrates apparatus of the extant alternative deactivatable tag making method.
Figure 14:
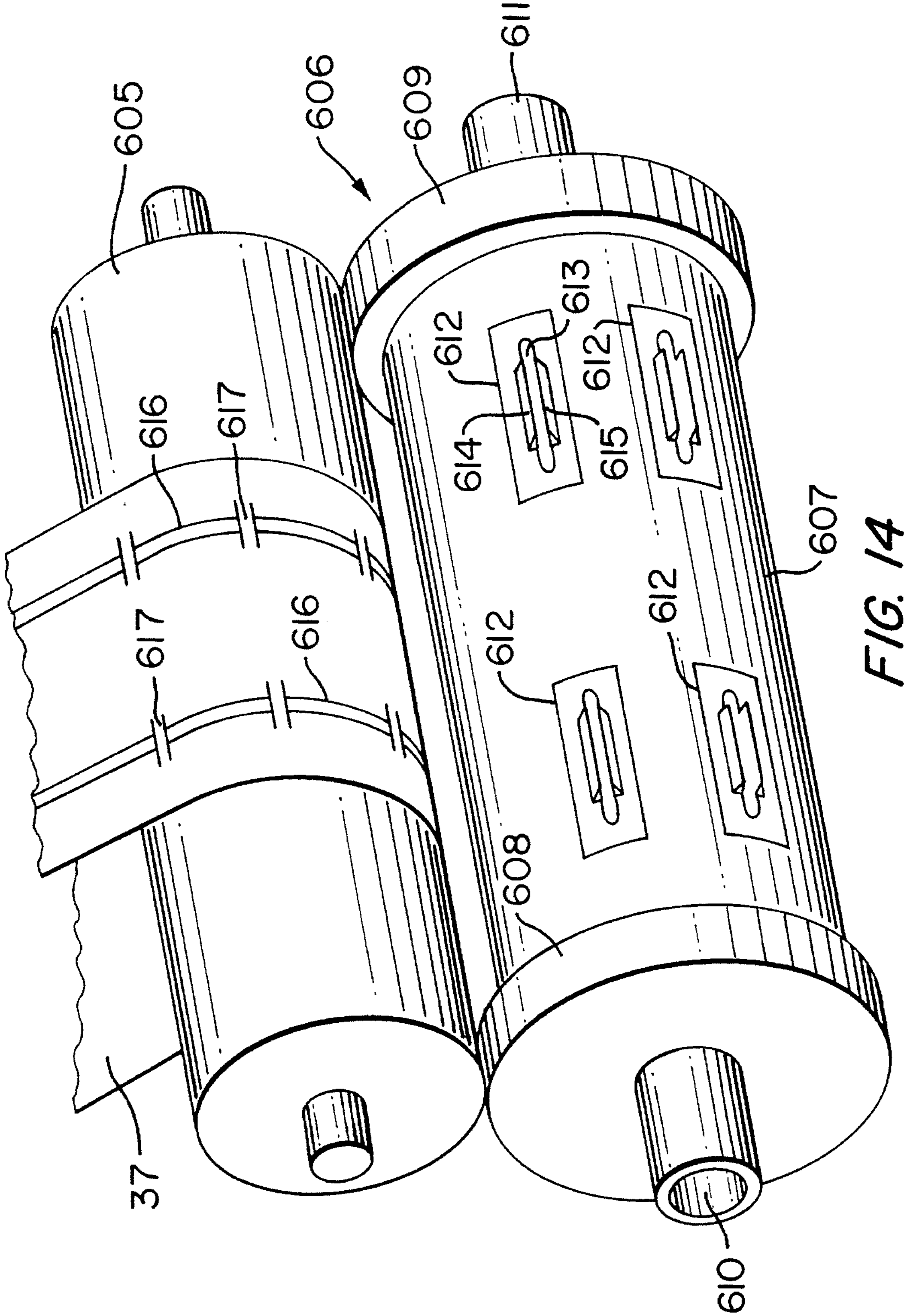
FIG. 14 is a perspective view of cutting and removing apparatus of the invention for removing deactivation structure between successive coils.

Referring to FIG. 14, composite web 37 is advanced over anvil roll 605. Vacuum cutting apparatus, generally shown at 606, includes roll 607 which has bearers 608 and 609 at ends thereof. Vacuum ports are shown at 610 and 611. Roll 607 has a hollow interior in communication with a vacuum source (not shown) through ports 610 and 611. Roll 605 and roll 607 replace roll 531 and roll 529 respectively of FIG. 12 as well as as well as roll 403 and 404 of FIG. 9. Cuts made by blades 614 and 615 do not penetrate through web 37 and would not be visible as shown at 520 in FIG. 12 or 407 in FIG. 9.

Figure 15:
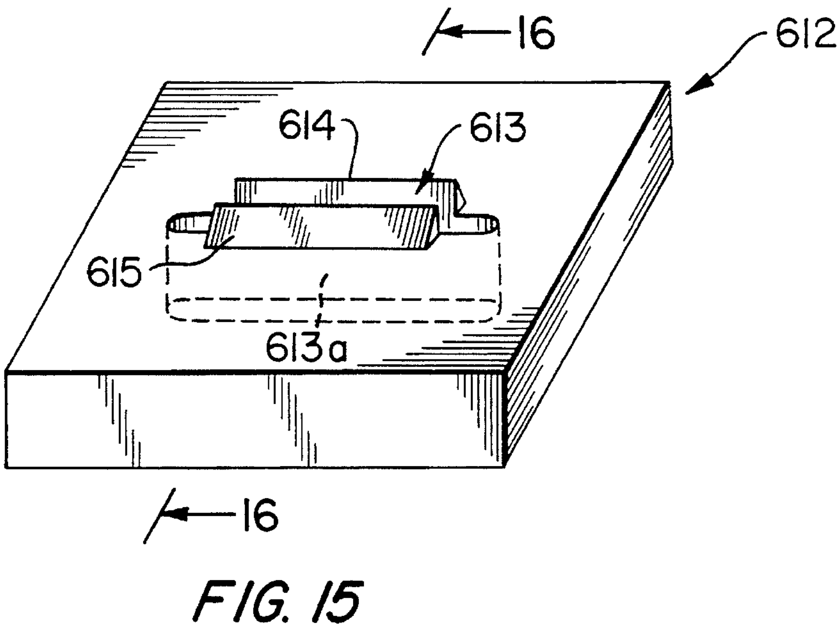
FIG. 15 is a perspective view of a cutting unit of the FIG. 14 apparatus.
Figure 16:
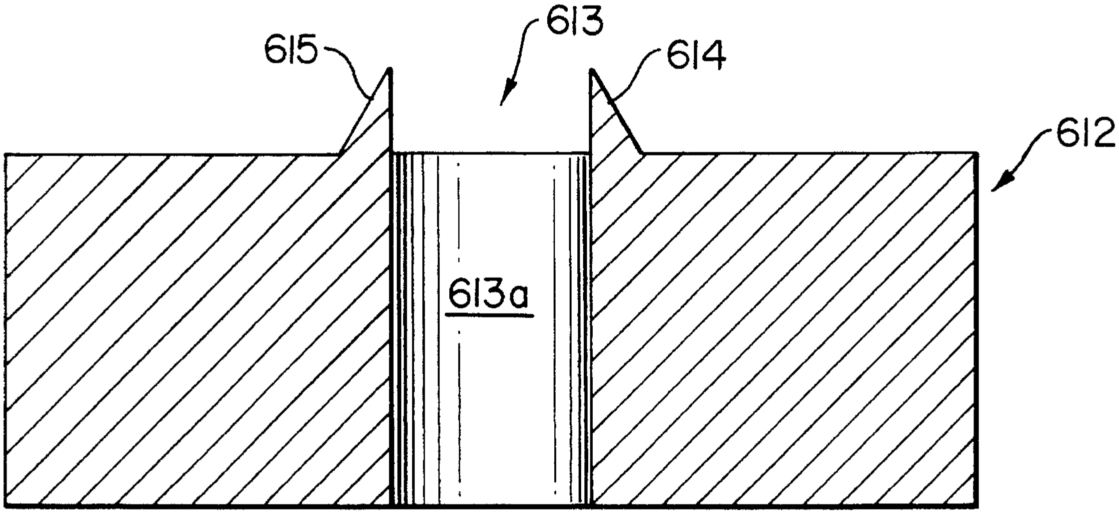
FIG. 16 is a sectional view of the FIG. 15 cutting unit.

Roll 607 has insert pockets in which are disposed cutting units 612. The structure of the cutting units is best seen in FIGS. 15 and 16, which show one cutting unit respectively in perspective and in cross-section. Cutting unit 612 is comprised of a metal body having an opening 613 in its upper surface and having a passage 613*a* extending fully therethrough into flow communication with the hollow interior of roll 607. Cutting blades 614 and 615 are located in bounding relation with the opening 613, but, of consequence discussed below, are not continuous perimetrically with opening 613, i.e., the ends of opening 613 are open to the ambient environment when the cutting blades are in cutting relation with web 37.

Referring again to FIG. 14, composite web 37 bears the opposed first and successions of coils and deactivator web 616 applied to one of the coil successions. The deactivator web is removed at locations 617, i.e., the deactivator web portion (ACW above) which intervenes successive coils, by action of cutting units 612 as now discussed.

Evidently, the spacing of cutting units perimetrically of roll 607 is equal to the length linewise between the deactivator portions desired to be removed as composite web 37 seats on anvil roll 605. If it were desired to cut fully through composite web 37, the height of the cutting blades would be made equal to the extent of bearers 608 and 609 radially outwardly of roll 607, or vice versa. On the other hand, per the subject invention, the height of the cutting blades 614 and 615 is selected to be shorter than the extent of bearers 608 and 609 radially outwardly of roll 607, or vice versa, i.e., such that the depthwise amount of material removed from composite web 37 is less than the depth of the web.

Figure 17:
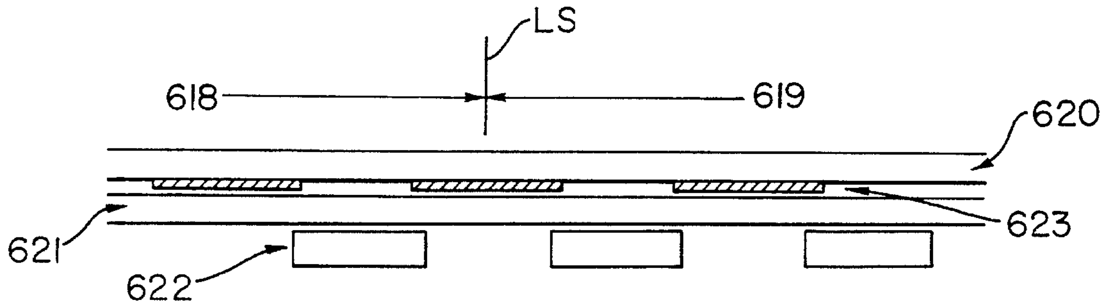
FIG. 17 is a schematic view descriptive of a situation prior to practice of the deactivator web removal step.

Referring to FIG. 17, it depicts a portion of composite web 37, showing two resonant tags 618 and 619 prior to the cutting thereof. Each tag has an outer insulative layer 620, a deadener layer 623, a deactivator layer 621 (comprised by web 616 of FIG. 14), and a coil layer 622, bridged by the deactivator layer 621.

Figure 18:
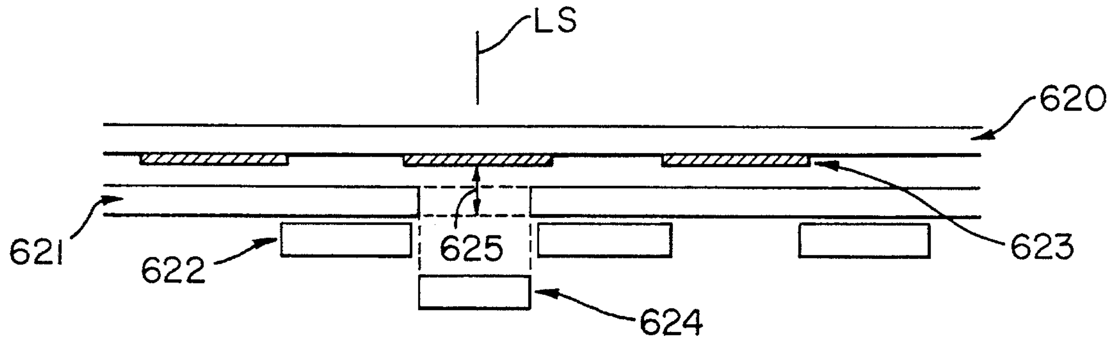
FIG. 18 is a schematic view descriptive of the situation following practice of the deactivator web removal step.

The results of the cutting operation are shown in FIG. 18. As illustrated, a plug of material 624, inclusive only of material previously of layer 621, is removed from web 616 by the action of the FIG. 14 apparatus. For such purpose, the desired cutting depth 625 of FIG. 17 is realized by making the difference between the extent of bearers 608 and 609 radially outwardly of roll 607 and the height of cutting blades equal to the measure of depth 625.

Of significance to applicant's above interrelating of the cutting blades, the bearers and the composite web dimensional characteristics is that coil layer 622 is fully uninvaded or mechanically disturbed. The deactivator portion is removed with little, if any invasion of outer insulative layer 620. Further, the vacuuming activity is limited to plug 624 which limits the amount of removal of adhesive, rendering the vacuum removal simpler and limiting need for manufacturing line interruption to clean the vacuum apparatus. In this aspect, the subject invention overcomes the disadvantages attending the extant practice above discussed in connection with FIG. 9, wherein holes 407 are punched fully through the resonant circuits, giving rise to invasion of all layers and need for removal of adhesives therein.

The tag succession in FIG. 18 is a novel article reached in the course of manufacture of deactivatable EAS tags, constituting a tag succession in which a continuous, i.e., unperforated, outer web 620 bounding an interior deactivator web having discontinuities between adjacent tags in the succession. Further, individual, i.e., separated, tags which result from the use of such article reached in the course of manufacture are likewise novel in having continuous bounding surfaces with deactivation structure therein which is recessed from a margin of the tag. Thus, as is seen in FIGS. 17 and 18, the line of separation LS for adjacent tag parts 618 and 619 extends beyond the end of deactivator layer 621 following removal of portion 624 thereof. Otherwise viewed, the individual tags so produced define unperforated bounding surfaces with an interior void adjacent the deactivation structure thereof.

Returning to discussion of the consequence of maintaining cutting blades 613 and 614 discontinuous, i.e., open at their respective ends to the ambient environment, any extent of cutting into outer insulative layer 620 causes only discontinuous side cuts, rather than full perimetric cuts, resulting in the outer insulative layer remaining wholly intact. Further, the open-ended cutting blade configuration enhances vacuum removal efficiency.

Figure 19:
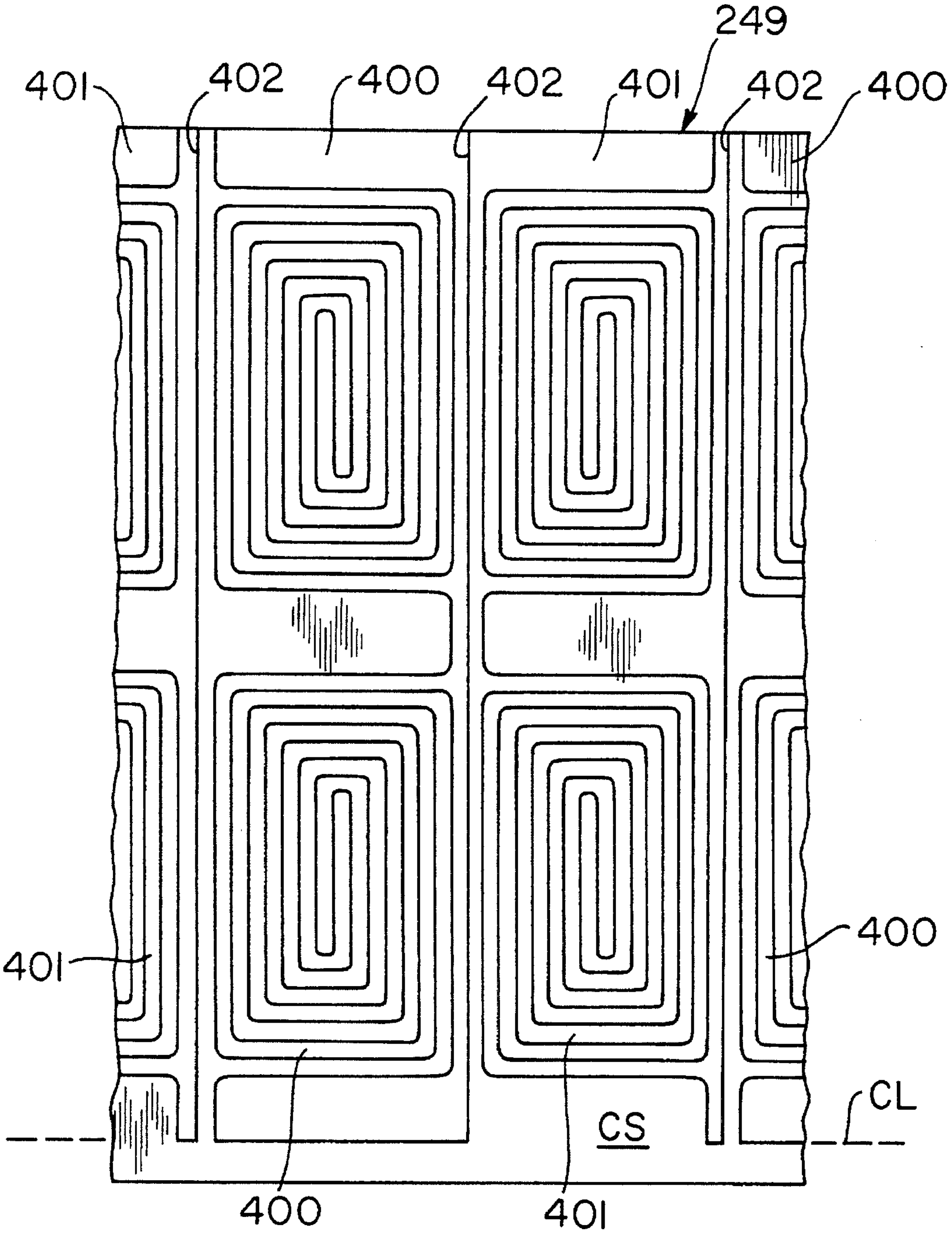
FIG. 19 a plan view of an alternative embodiment of coil structure in accordance with the invention.

While the embodiment of FIG. 13 above involved the use of an electrostatic drain which was separate from the metal web forming the coils, the invention contemplates the converse situation, i.e., wherein the electrostatic drain is integral with the metal web. Referring to FIG. 19, which corresponds in part to FIG. 22 of the '856 patent, the metal web, which may be comprised of copper or aluminum, is of increased transverse dimension, encompassing conductive strip CS at one margin thereof. Coils 401 are the coils to which the deactivator structure is to be applied. Conductive strip CS is formed integrally with the coils and thus has electrical connection to coils 401. It remains in place, electrically grounded, until a final phase of the manufacturing process, providing electrostatic charge drain and permitting flexibility in selection of the point in the process of removal of the deactivator portions. At the final phase, conductive strip CS is cut from the coil structures along cutting line CL of FIG. 19.

In summary of the foregoing and by way of introduction to the ensuing claims, one method of the invention provides for the manufacture of deactivatable electronic article surveillance tags by providing a continuous web of electrically insulative material, applying to opposed surfaces of the electrically insulative material web a succession of first and second electrically conductive coils and applying to the succession of first electrically conductive coils a normally electrically insulative deactivation structure extending across the first coil succession and convertible to be electrically conductive, the improvement comprising the step of providing an electrostatic charge drain in electrically conductive relation with each of the first electrically conductive coils substantially throughout the manufacture of the tags.

The step of providing an electrostatic charge drain is practiced by providing an elongate electrically conductive member across the succession of first electrically conductive coils in electrical continuity therewith, the elongate electrically conductive member and the deactivation structure being disposed on a common side of the succession of first electrically conductive coils in mutually spaced relation transversely thereof. Preferably, the elongate electrically conductive member is disposed along a transverse margin of the succession of first electrically conductive coils and the deactivation structure is disposed generally centrally of the succession of first electrically conductive coils.

The method includes the further step of removing a portion of the deactivator structure from the tags in an early stage of manufacture and removing the electrostatic charge drain from the tags in a final stage of manufacture thereof.

The succession of first electrically conductive coils is provided by the use of a continuous web of electrically conductive material cut to form the succession of first electrically conductive coils and the electrostatic charge drain may be formed also from the continuous web of electrically conductive material. In this case, the step of removing the electrostatic charge drain by cutting the same from the succession of first electrically conductive coils in a final stage of manufacture of the tags.

The insulative material web is preferably provided with a continuous electrostatic charge drain web comprised of electrically conductive material prior to application of the succession of first electrically conductive coils to the insulative material web and disposing the succession of first electrically conductive coils in contact with the continuous electrostatic charge drain web.

A further method of the invention effects the manufacture of electronic article surveillance tags by providing a continuous web of electrically insulative material, applying to opposed surfaces of the electrically insulative material web a succession of first and second electrically conductive coils and applying to the succession of first electrically conductive coils a continuous deactivator web extending across the first coil succession, the improvement comprising the steps of draining electrostatic charge from each of the first electrically conductive coils up to a final stage in the manufacture of the tags at which stage the first and second successions of coils are in facing relation across the web of electrically insulative material and rendering the deactivation structure web discontinuous between successive of said first electrically conductive coils at a prior manufacturing stage.

The step of rendering the deactivator web discontinuous is practiced by removing portions thereof without attendant removal of portions of the web of electrically insulative material in registry with the removed deactivator web portions. In particular, the removal step is practiced by making transverse cuts lengthwise in excess of a transverse dimension of the deactivator web, the cuts not extending longitudinally of the deactivator web. The cuts may extend also into but not through the web of electrically insulative material. The removing step is practiced by vacuum apparatus.

The structure depicted in FIG. 18, will be seen to constitute a new deactivatable EAS tag structure obtained in the course of manufacture of electronic article surveillance tags. Thus the illustrated structure comprises a succession of mutually spaced conductive circuits on an insulative layer with a deactivation structure placed between the conductive circuits and the insulative layer, the deactivation structure being discontinuous between conductive circuits in the succession, and the insulative layer being continuous between conductive circuits in the succession. Also, as above noted, individual deactivatable EAS tags per the invention, exhibit novel structure.

Apparatus for use in vacuum removal of a selected layer from a multilayered web structure is also at hand, comprising a cutting roll having a hollow interior and at least one vacuum port communicating with the interior for connection to a vacuum source, the cutting roll supporting a pair of perimetrically spaced cutting blades directed longitudinally of the cutting roll on an exterior surface thereof and defining a passage extending from open space between the cutting blades into the hollow interior thereof. The apparatus further includes bearers supported on the cutting roll to rotate therewith and an anvil roll disposed in contact with the bearers. The extent of the cutting blades radially exteriorly of the cutting roll and the radial distance between the bearers and the cutting roll are of respective measures effecting the selective layer removal.

Various changes in practice and modifications in structure may evidently be introduced in the foregoing particularly disclosed and described embodiments and practices without departing from the invention. Thus, such embodiments and practices are intended in an illustrative and not in a limiting sense. The true spirit and scope of the invention is set forth in the ensuing claims.

What is claimed is:

1. In a method for the manufacture of deactivatable electronic article surveillance tags by providing a continuous web of electrically insulative material, applying to opposed surfaces of said electrically insulative material web a succession of first and second electrically conductive coils and applying to said succession of first electrically conductive coils a normally electrically insulative deactivation structure extending across the first coil succession and convertible to be electrically conductive, the improvement comprising the step of providing an electrically grounded electrostatic charge drain in electrically conductive relation with each of said first electrically conductive coils substantially throughout the manufacture of said tags and the further step of removing said electrostatic charge drain from said tags in a final stage of manufacture thereof.

2. The invention claimed in claim 1 wherein said step of providing an electrostatic charge drain is practiced by providing an elongate electrically conductive member across said succession of first electrically conductive coils in electrical continuity therewith and by electrically grounding said elongate electrically conductive member.

3. The invention claimed in claim 2 wherein said elongate electrically conductive member and said deactivation structure are disposed on a common side of said succession of first electrically conductive coils in mutually spaced relation transversely thereof.

4. The invention claimed in claim 3, wherein said elongate electrically conductive member is disposed along a transverse margin of said succession of first electrically conductive coils.

5. The invention claimed in claim 4 wherein said deactivation structure is disposed generally centrally of said succession of first electrically conductive coils.

6. The invention claimed in claim 1 wherein said succession of first electrically conductive coils is provided by the use of a continuous web of electrically conductive material cut to form said succession of first electrically conductive coils and wherein said electrostatic charge drain is formed also from said continuous web of electrically conductive material.

7. The invention claimed in claim 6 wherein the further step of removing said electrostatic charge drain is practiced by cutting the same from succession of first electrically conductive coils in a final stage of manufacture of said tags.

8. In a method for the manufacture of electronic article surveillance tags by providing a continuous web of electrically insulative material, applying to opposed surfaces of said electrically insulative material web a succession of first and second electrically conductive coils and applying to said succession of first electrically conductive coils a continuous deactivator web extending across the first coil succession, the improvement comprising the steps of draining electrostatic charge electrically conductively to ground from each of said first electrically conductive coils up to a final stage in the manufacture of said tags at which stage said first and second successions of coils are in facing relation across said web of electrically insulative material and rendering the deactivator web discontinuous between successive of said first electrically conductive coils at a prior manufacturing stage, said step of draining electrostatic charge conductively to ground from each of said first electrically conductive coils being practiced laminating an electrostatic drain web to said insulative material web and wherein said electrostatic charge drain web is selected to be of dimension substantially lesser than the transverse expanse of said insulative material web, said electrostatic charge drain web being configured as a marginal portion of said succession of said first electrically conductive coils.

9. The invention claimed in claim 8 wherein said step of rendering said deactivator web discontinuous is practiced by removing portions thereof without attendant removal of portions of said insulative material web in registry with the removed deactivator web portions.

10. In a method for the manufacture of electronic article surveillance tags by providing a continuous web of electrically insulative material, applying to opposed surfaces of said electrically insulative material web a succession of first and second electrically conductive coils and applying to said succession of first electrically conductive coils a continuous web of normally electrically insulative deactivation structure extending across the first coil succession and convertible to be electrically conductive, the improvement comprising the step of rendering said deactivation structure web discontinuous by removing portions thereof without attendant removal of portions of said web of electrically insulative material in registry with said removed deactivation structure web portions, said step of removing portions of said deactivation structure web being practiced by making transverse cuts therethrough lengthwise in excess of a transverse dimension of said deactivation structure web, said cuts not extending longitudinally of said deactivation structure web, said cuts extend also into but not through said web of electrically insulative material.

11. The invention claimed in claim 10 wherein said removing step is practiced by vacuum apparatus.

12. In a method for the manufacture of electronic article surveillance tags by providing a continuous web of electrically insulative material, applying to opposed surfaces of said electrically insulative material web a succession of first and second electrically conductive coils and applying to said succession of first electrically conductive coils a continuous web of normally electrically insulative deactivation structure extending across the first coil succession and convertible to be electrically conductive, the improvement comprising the steps of draining electrostatic charge electrically conductively to ground from each of said first electrically conductive coils up to a given stage in the manufacture of said tags at which stage said first and second successions of coils are in facing relation across said web of electrically insulative material and rendering said deactivation structure web discontinuous at a manufacturing stage preceding said given stage, said step of rendering said deactivation structure web discontinuous being practiced by removing portions thereof without attending removal of portions of said web of electrically insulative material in registry with said removed deactivation structure web portions by making transverse cuts therethrough lengthwise in a transverse dimension of said deactivation structure web, said cuts not extending longitudinally of said deactivation structure web, said cuts extend also into but not through said web of electrically insulative material.

13. The invention claimed in claim 12 wherein said removing step is practiced by vacuum apparatus.

14. In a method for the manufacture of electronic article surveillance tags by providing a continuous web of electrically insulative material, applying to opposed surfaces of said electrically insulative material web a succession of first and second electrically conductive coils and applying to said succession of first electrically conductive coils a normally electrically insulative deactivator web extending across the first coil succession, the improvement wherein said deactivator web is rendered discontinuous between said first electrically conductive coils prior to said step of applying said succession of first and second electrically conductive coils to opposed surfaces of said electrically insulative material web, providing an electrostatic charge drain to ground electrically conductively for each of said first electrically conductive coils following application thereof to said web, and the further step of removing said electrostatic charge drain from said tags in a final stage of manufacture thereof.

15. The invention claimed in claim 14 wherein said deactivator web is selected to be electrically insulative and convertible to be electrically conductive.

16. The invention claimed in claim 15 wherein said deactivator web is selected to comprise a first layer adjacent said first electrically conductive coils and of electrically insulative material convertible to be electrically conductive and a second layer separated from said first electrically conductive coils by said first layer and of electrically conductive material.

17. The invention claimed in claim 14 wherein said step of providing an electrostatic charge drain is practiced by providing an elongate electrically conductive member across said succession of first electrically conductive coils in electrically continuity therewith.

18. The invention claimed in claim 17 wherein said elongate electrically conductive member and said deactivator web are disposed on a common side of said succession of first electrically conductive coils in mutually spaced relation transversely thereof.

19. The invention claimed in claim 18 wherein said elongate electrically conductive member is disposed along a transverse margin of said succession of first electrically conductive coils.

20. The invention claimed in claim 19 wherein said deactivator web is disposed generally centrally of said succession of first electrically conductive coils.

21. The invention claimed in claim 14 wherein said succession of first electrically conductive coils is provided by the use of a continuous web of electrically conductive material cut to form said succession of first electrically conductive coils and wherein said electrostatic charge drain is formed also from said continuous web of electrically conductive material.

22. The invention claimed in claim 21 wherein the further step of removing said electrostatic charge drain is practiced by cutting the same from succession of first electrically conductive coils in a final stage of manufacture of said tags.

23. An electronic article surveillance tag produced by the method of claim 1.

24. An electronic article surveillance tag produced by the method of claim 8.

25. An electronic article surveillance tag produced by the method of claim 12.

* * * * *

UNITED STATES PATENT AND TRADEMARK OFFICE

CERTIFICATE OF CORRECTION

PATENT NO. : 5,494,550

DATED : February 27, 1996

INVENTOR(S) : S. Eugene Benge

It is certified that error appears in the above-indentified patent and that said Letters Patent is hereby corrected as shown below:

Col. 13, line 23, change "attending" to -- attendant --.

Col. 14, line 17, change "electrically" to -- electrical --.

Signed and Sealed this

Thirtieth Day of July, 1996

Attest:

BRUCE LEHMAN

*Attesting Officer*

*Commissioner of Patents and Trademarks*